(12) United States Patent
Birch et al.

(10) Patent No.: US 11,297,179 B2
(45) Date of Patent: Apr. 5, 2022

(54) SYSTEMS FOR VERIFYING IDENTITIES OF PARTIES PARTICIPATING IN DISTRIBUTED NETWORK COMMUNICATION

(71) Applicant: BANK OF AMERICA CORPORATION, Charlotte, NC (US)

(72) Inventors: Christopher Daniel Birch, Dayton, OH (US); Susan R. Hart, Addison, TX (US); Kelly Renee-Drop Keiter, Waxhaw, NC (US); Lisa Matthews, Charlotte, NC (US); Cody Dean Searl, Pineville, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 23 days.

(21) Appl. No.: 16/861,359

(22) Filed: Apr. 29, 2020

(65) Prior Publication Data

US 2021/0344791 A1 Nov. 4, 2021

(51) Int. Cl.
| | |
|---|---|
| *H04M 3/42* | (2006.01) |
| *H04W 12/69* | (2021.01) |
| *H04W 12/48* | (2021.01) |
| *H04M 3/436* | (2006.01) |
| *H04L 61/4557* | (2022.01) |
| *H04W 76/11* | (2018.01) |

(Continued)

(52) U.S. Cl.
CPC ...... *H04M 3/42042* (2013.01); *H04L 61/157* (2013.01); *H04M 3/22* (2013.01); *H04M 3/4365* (2013.01); *H04W 8/26* (2013.01); *H04W 12/48* (2021.01); *H04W 12/69* (2021.01); *H04W 76/11* (2018.02)

(58) Field of Classification Search
CPC .......... H04W 4/12; H04W 4/14; H04W 4/20; H04W 88/00–06; H04W 92/04; H04W 92/16; H04W 92/18
See application file for complete search history.

(56) References Cited

U.S. PATENT DOCUMENTS

| | | |
|---|---|---|
| 8,768,802 B2 | 7/2014 | Engle et al. |
| 9,934,511 B2 | 4/2018 | Groarke |

(Continued)

*Primary Examiner* — San Htun
(74) *Attorney, Agent, or Firm* — Moore & Van Allen PLLC; James C. Edwards (57) ABSTRACT

Verification of the identities of parties participating in network-based communication, such as telephone communication, including SMS/text communication, email communication and the like is provided. Communication identifiers (IDs) (e.g., telephone numbers, email addresses or the like) are verified as being associated with one or more communication parties and, in response, a verified communication (ID) database is established. The verified communication ID database is relied upon when a user/communication is selecting a communication ID as an address for an impending communication or receiving a communication for determining whether the communication ID is verifiably associated with a known communication party. If the communication ID is determined to be verifiably associated with a known communication party, a visual or audible output may be provided on the user's device or within the communication that indicates that the communication ID is verifiably associated with the known communication party.

14 Claims, 7 Drawing Sheets

(51) Int. Cl.
*H04W 8/26* (2009.01)
*H04M 3/22* (2006.01)

(56) References Cited

U.S. PATENT DOCUMENTS

| | | | |
|---|---|---|---|
| 10,319,042 | B2 | 6/2019 | Arvapally et al. |
| 10,339,549 | B1 | 7/2019 | Ramalingam et al. |
| 10,423,947 | B1 | 9/2019 | Baar et al. |
| 2007/0214356 | A1* | 9/2007 | Song ................. H04L 63/08 713/156 |
| 2009/0100346 | A1* | 4/2009 | O'Sullivan ........... H04L 63/102 715/743 |
| 2014/0040126 | A1* | 2/2014 | Andrews ................ G06Q 20/40 705/41 |
| 2016/0226872 | A1* | 8/2016 | Oberheide .......... H04L 63/0876 |
| 2016/0294842 | A1* | 10/2016 | Ramalingam ......... G06F 3/0481 |
| 2017/0024783 | A1 | 1/2017 | Gupta et al. |
| 2017/0161696 | A1 | 6/2017 | Hattar et al. |
| 2019/0205951 | A1 | 7/2019 | Brock |
| 2019/0228411 | A1 | 7/2019 | Hernandez-Ellsworth et al. |
| 2020/0005271 | A1 | 1/2020 | Baar et al. |

* cited by examiner

SYSTEMS FOR VERIFYING IDENTITIES OF PARTIES PARTICIPATING IN DISTRIBUTED NETWORK COMMUNICATION

FIELD OF THE INVENTION

The present invention relates to network communication and, more specifically, providing for identity verification of parties participating in distributed network communications, such as, but not limited to, telephone calls, electronic mail, text/Short Message Service (SMS) messages and the like.

BACKGROUND

In today's communication environment parties to a communication, such as telephone callers and recipients, electronic mail (email) senders and recipients and the like have no foolproof and/or dynamic means to determine if the communication identifier (ID), e.g., telephone number, email address or the like is, in fact, associated with party that the communication ID purports to be associated with. For example, a telephone call recipient may receive a call from a caller that purports to be a trusted entity, such as a financial entity, a charity or the like. If the telephone call recipient questions the veracity of the identity of the caller, the only option that the recipient may have is to disengage from the current call (i.e., hang up) and call back at a telephone number they believe to be associated with the trusted entity (i.e., a number provided in a trusted listing, such as a website, mailing, card face or the like). Furthermore, when a calling party locates a telephone number of a desired call recipient through an unverified or otherwise questionable source, the calling party may not be without doubt that the telephone number is, in fact, associated with the desired call recipient.

The inability to verify the identity of telephone callers/recipient, email senders/recipients and the like is especially problematic with the proliferation of nefarious entities masquerading as actual communication parties, such as financial institutions, charities and the like, in attempt to gain access to a parties confidential information and/or resources. In this regard, a nefarious entity may use a communication ID that is highly similar or otherwise appears to be an actual communication ID of the alleged communication party, when, in fact, the communication ID is associated with the nefarious entity.

Therefore, a need exists to develop systems, methods, computer program products and the like that provide dynamic verification that communication IDs are, in fact, associated with the communication party that they purport to be associated with. In this regard, the desired systems and the like should provide a communication receiver, such as a telephone call recipient or email recipient with instantaneous/dynamic recognition that that the communication ID (i.e., telephone number, email address or the like) is verifiably associated with the communication party that it purports to associated with. Further, the desired systems and the like should provide a communication sender, such as a telephone caller or email sender verified assurance that a communication ID that they select for making a call or sending an email is, in fact, associated with the communication party that it purports to be associated with.

SUMMARY OF THE INVENTION

The following presents a simplified summary of one or more embodiments in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, computer-implemented methods, computer program products and the like that provide verification of the identities of parties participating in network-based communication, such as telephone communication, including SMS/text communication, email communication and the like. In this regard, the present invention verifies that communication identifiers (IDs) (e.g., telephone numbers, email addresses or the like) are associated with one or more communication parties and, in response to verification, establishes a verified communication (ID) database that stores records that serve to verifiably associate the communication IDs with the communication parties. In response to a first communication party selecting or inputting a communication ID for purposes of addressing a network-based communication or identifying a communication ID from a received network-based communication, the database is used to determine whether the communication ID is verifiably associated with the communication party (i.e., intended recipient or the sender). If the determination is made that the communication ID is verifiably associated with the communication, a visual or audible output (e.g., a flag, check mark or predetermined sound) is provided at the user device that indicates that the communication ID is verifiably associated with the communication party.

In specific embodiments of the invention, the primary communication application being implemented on a user device, such as telephone call application, an email application and Short Message Service (SMS)/text application, is monitored for identifying communication IDs from inbound and outbound call, emails, texts or the like. Once a communication ID has been identified, the verified communication ID database is accessed to determine whether the communication ID is verifiably associated with a communication party. If the communication ID is determined to be verifiably associated with the communication party, a visual or audible output is provided to the call/text/email recipient or call/text/email sender that the communication ID of the call/email/text being sent or received is, in fact, verifiably associated with the communication party (i.e., the party to whom the call/text/email is being sent or the party from whom the call/text/email is being received).

In other specific embodiments of the invention of the invention, a user (e.g., telephone caller or email sender) is provided a verified communication ID application, which provides the user access to at least a portion of the verified communication ID database. In this regard, a user can select a communication ID (or a communication party) from the database and have verified knowledge, through visual or audible output of an indicator, that the communication ID they are selecting for making a call or sending an email is, in fact, a communication ID associated with the intended communication party/receipt.

A system for verifying identities of parties participating in network communications defines first embodiments of the invention. The system includes a first computing platform having a first memory and at least one first processing device in communication with the first memory. The first memory stores first instructions that are executable by the first processing device and configured to verify that communication identifiers (e.g., telephone numbers, email addresses, tokens associated with either telephone numbers or email addresses and the like) are, in fact, associated with at least one of a plurality of communication parties. The system additionally includes a communication identifier database configured to receive the verified communication identifiers and associated communication parties and store records that serve to associate each of the communication identifiers with one or more of the communication parties.

The system additionally includes a second communication platform having a second memory and at least one second processing device in communication with the second memory. The second memory stores second instructions that are executable by the second processing device. The second instructions are configured to, in response to a first party selecting or inputting, at a first device, a first communication identifier for purposes of addressing a first network-based communication that is being sent to a second party, determine, from the communication identifier database, whether the first communication identifier is verifiably associated with the second party. In addition, the second instructions are configured to, in response to determining that the first communication identifier is verifiably associated with the second party, provide a visual or audible output at the first device that indicates that the second party is verified as being associated with first communication identifier.

In specific embodiments of the system, the second instructions are further configured to, in response to determining that the first communication identifier is verifiably associated with the second party, initiate the first network-based communication to the second party.

In further specific embodiments of the invention, the second instructions are further configured to, in response to the first device receiving a second network-based communication, identify a second communication identifier included within the second network-based communication. In addition, the second instructions are configured to, in response to identifying the second communication identifier, determine, from the communication identifier database, whether the second communication identifier is verifiably associated with a communication party. Further, the second instructions are configured to, in response to determining that the second communication identifier is verifiably associated with a communication party, provide, as part of the second communication, a visual or audible output at a first device that is configured for at least one (i) identifying the communication party as the sender of the second network-based communication and (ii) indicating that the communication party is verifiably associated with second communication identifier.

In additional specific embodiments of the system, the second instructions are further configured to act as proxy for a communication application that is executable on the first device. In this regard, the second instructions are further configured to monitor the communication application to identify first communication identifiers being selected by the first party for purposes of addressing communications being communicated through the communication application to second parties. In addition, in such embodiments of the system, the second instructions are configured to, in response to identifying a first communication identifier, access the communication identifier database to determine whether the first communication identifier is verifiably associated with a second party. Moreover, in such embodiments of the system, the second instructions are further configured to, in response to determining that the first communication identifier is verifiably associated with the second party, provide a visual or audible output at the first device that indicates that the second party is verified as being associated with first communication identifier and, in some specific embodiments, initiate the first network-based communication to the second party.

In related embodiments of the system, in which the second instructions are further configured to act as proxy for a communication application that is executable on the first device, the second instructions are further configured to monitor the communication application for receipt of second network-based communications and identify, from the communications, second communication identifiers included within the second network-based communications. Additionally, in such embodiments, the second instructions are further configured to, in response to identifying a second communication identifier, access the communication identifier database to determine whether the second communication identifier is verifiably associated with a communication party. Further, in such embodiments of the system, the second instructions are further configured to, in response to determining that the second communication identifier is verifiably associated with a communication party, provide, as part of the second communication, a visual or audible output at a first device that is configured for at least one of (i) identifying the communication party as the sender of the second network-based communication and (ii) indicating that the communication party is verifiably associated with second communication identifier.

Additionally, in other specific embodiments of the system, the second instructions are configured to provide the first device with a visual or audible listing, compiled from the communication identifier database, of a plurality of verified communication identifiers and corresponding parties associated with each of the verified communication identifiers. Additionally, in such embodiments of the system the second instructions are further configured to, in response to the first party selecting one of (i) a first verified communication identifier from the listing or (ii) a second party associated with the first verified communication identifier, address the first network-based communication with the first verified communication identifier, and provide the visual or the audible output at the first device that indicates that the second party to is verified as being associated with first communication identifier.

Moreover, in additional specific embodiments of the system, the first instructions are further configured to implement a trusted distributed communication network including a plurality of decentralized nodes to validate, based on a convergence by at least two of the decentralized nodes, that the communication identifiers are verifiably associated with at least one of the plurality of communication parties. In related embodiments of the system, the first instructions are configured to store the database as part of a distributed ledger that is in communication with or stored within the trusted distributed communication network.

A computer-implemented method for verifying identities of parties participating in network communications defines second embodiments of the invention. The computer-implemented method is executable by one more processing devices. The method includes verifying that each of a plurality of communication identifiers are associated with at least one of a plurality of communication parties. The method further includes storing, within a database, a plurality of records, each record serving to verify an association of one of the plurality of communication identifiers with at least one of the communication parties. In addition, the method includes, in response to a first party selecting or inputting, at a first device, a first communication identifier for purposes of addressing a first network-based communication that is being sent to a second party, determining, from the database, whether the first communication identifier is verifiably associated with the second party. Moreover, the method includes, in response to determining that the first communication identifier is verifiably associated with the second party, providing a visual or audible output at the first device that indicates that the second party is verified as being associated with first communication identifier.

In specific embodiments the computer-implemented method further includes, in response to determining that the first communication identifier is verifiably associated with the second party, initiating the first network-based communication to the second party.

In other specific embodiments the computer-implemented method further includes, in response to the first device receiving a second network-based communication, identifying a second communication identifier included within the second network-based communication. Additionally, in such embodiments, the method additionally includes, in response to identifying the second communication identifier, determining, from the database, whether the second communication identifier is verifiably associated with a communication party. Further, in such embodiments, the method includes, in response to determining that the second communication identifier is verifiably associated with a communication party, providing, as part of the second communication, a visual or audible output at a first device that is configured for at least one (i) identifying the communication party as the sender of the second network-based communication, and (ii) indicating that the communication party is verifiably associated with second communication identifier.

In still further specific embodiments of the computer-implemented method includes monitoring a communication application to identify first communication identifiers being selected by the first party for purposes of addressing communications being communicated through the communication application to second parties. In such embodiments of the computer-implemented method, determining further includes, in response to identifying a first communication identifier, accessing the database to determine whether the first communication identifier is verifiably associated with the second party. In related embodiments, the computer-implemented method further includes monitoring the communication application for receipt of second network-based communications and identify, from the communications, second communication identifiers included within the second network-based communications. In such embodiments, the computer-implemented method further includes, in response to identifying a second communication identifier, accessing the database to determine whether the second communication identifier is verifiably associated with a communication party. Additionally, in such embodiments the computer-implemented method further includes, in response to determining that the second communication identifier is verifiably associated with a communication party, providing, as part of the second communication, a visual or audible output at a first device that is configured for at least one of (i) identifying the communication party as the sender of the second network-based communication and (ii) indicating that the communication party is verifiably associated with second communication identifier.

Moreover, in further specific embodiments the computer-implemented method includes providing the first device with a visual or audible listing, compiled from the database, of a plurality of verified communication identifiers and corresponding parties associated with each of the verified communication identifiers. Additionally, in such embodiments of the computer-implemented method, determining and providing the visual or audible output further include, in response to the first party selecting one of (i) a first verified communication identifier from the listing or (ii) a second party associated with the first verified communication identifier, addressing the first network-based communication with the first verified communication identifier, and providing the visual or the audible output at the first device that indicates that the second party to is verified as being associated with first communication identifier.

A computer program product comprising non-transitory computer-readable code defines third embodiments of the invention. The computer-readable code includes a first set of codes for causing a computer processing device to verify that each of a plurality of communication identifiers are associated with at least one of a plurality of communication parties. In addition, the computer-readable code includes a second set of codes for causing a computer processing device to store, within a database, a plurality of records, each record serving to verify an association of one of the plurality of communication identifiers with at least one of the communication parties. Further, the computer-readable code includes a third set of codes for causing a computer processing device to, in response to a first party selecting or inputting, at a first device, a first communication identifier for purposes of addressing a first network-based communication that is being sent to a second party, determine, from the database, whether the first communication identifier is verifiably associated with the second party. In addition, the computer-readable code includes a fourth set of codes for causing a computer processing device to, in response to determining that the first communication identifier is verifiably associated with the second party, provide a visual or audible output at the first device that indicates that the second party is verified as being associated with first communication identifier and, in some specific embodiments, initiate the first network-based communication to the second party.

In specific embodiments of the computer program product, the computer-readable medium further includes a fifth set of codes for causing a computer processing device to, in response to the first device receiving a second network-based communication, identifying a second communication identifier included within the second network-based communication. In addition, the computer-readable medium includes a sixth set of codes for causing a computer processing device to, in response to identifying the second communication identifier, determine, from the database, whether the second communication identifier is verifiably associated with a communication party. Further, the computer-readable code includes a seventh set of codes for causing a computer processing device to, in response to determining that the second communication identifier is verifiably associated with a communication party, provide, as part of the second communication, a visual or audible output at a first device that is configured for at least one (i) identifying the communication party as the sender of the second network-based communication, and (ii) indicating that the communication party is verifiably associated with second communication identifier.

According to further specific embodiments of the computer program product, the computer-readable medium additionally includes a fifth set of codes for causing a computer monitoring a communication application to identify (i) first communication identifiers being selected by the first party for purposes of addressing communications being communicated through the communication application to second parties, and (ii) from the second network-communications received at the communication application, second communication identifiers included within the second network-based communications. In such embodiments of the computer program product, the third set of codes are further configured to cause the computer processing device to, in response to identifying a first and second communication identifiers, accessing the database to determine (i) whether the first communication identifier is verifiably associated with the second party and (ii) whether the second communication identifier is verifiably associated with a communication party. Additionally, in such embodiments of the computer program product, the fourth set of codes are further configured to cause the computer processor device to, in response to determining that the second communication identifier is verifiably associated with a communication party, provide one of (i) a visual or audible output at the first device that indicates that the second party is verified as being associated with first communication identifier, and (ii) as part of the second communication, a visual or audible output at a first device that is configured for at least one of (a) identifying the communication party as the sender of the second network-based communication and (b) indicating that the communication party is verifiably associated with second communication identifier.

Thus, systems, apparatus, methods, and computer program products herein described in detail below provide for provide verification of the identities of parties participating in network-based communication, such as telephone communication, including SMS/text communication, email communication and the like. In this regard, the present invention verifies that communication identifiers (IDs) (e.g., telephone numbers, email addresses or the like) are associated with one or more communication parties and, in response to verification, establishes a verified communication (ID) database that stores records that serve to verifiably associate the communication IDs with the communication parties. The database is subsequently used as the basis for determining whether a selected communication ID for communication being sent or a communication ID in a communication received is verifiably associated with communication party (i.e., the intended recipient of the communication or the alleged sender of the communication).

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, embodiments of the invention provide verification of the identities of parties participating in network-based communication, such as telephone communication, including SMS/text communication, email communication and the like. In this regard, the present invention verifies that communication identifiers (IDs) (e.g., telephone numbers, email addresses or the like) are associated with one or more communication parties and, in response to verification, establishes a verified communication (ID) database that stores records that serve to verifiably associate the communication IDs with the communication parties. The verified communication ID database is subsequently relied upon when a user/communication is selecting a communication ID as an address for an impending communication or receiving a communication for determining whether the communication ID is verifiably associated with a known communication party. If the communication ID is determined to be verifiably associated with a known communication party, a visual or audible output may be provided on the user's device or within the communication that indicates that the communication ID is verifiably associated with the known communication party.

In specific embodiments of the invention, the primary communication application being implemented on a user device, such as telephone call application, an email application and SMS/text application, is monitored for identifying communication IDs from inbound and outbound call, emails, texts or the like. Once a communication ID has been identified, the verified communication ID database is accessed to determine whether the communication ID is verifiably associated with a communication party. If the communication ID is determined to be verifiably associated with the communication party, a visual or audible output is provided to the call/text/email recipient or call/text/email sender that the communication ID of the call/email/text being sent or received is, in fact, verifiably associated with the communication party (i.e., the party to whom the call/text/email is being sent or the party from whom the call/text/email is being received).

In other specific embodiments of the invention of the invention, a user (e.g., telephone caller or email sender) is provided a verified communication ID application, which provides the user access to at least a portion of the verified communication ID database. In this regard, a user can select a communication ID (or a communication party) from the database and have verified knowledge, through visual or audible output of an indicator, that the communication ID they are selecting for making a call or sending an email is, in fact, a communication ID associated with the intended communication party/receipt.

Figure 1:
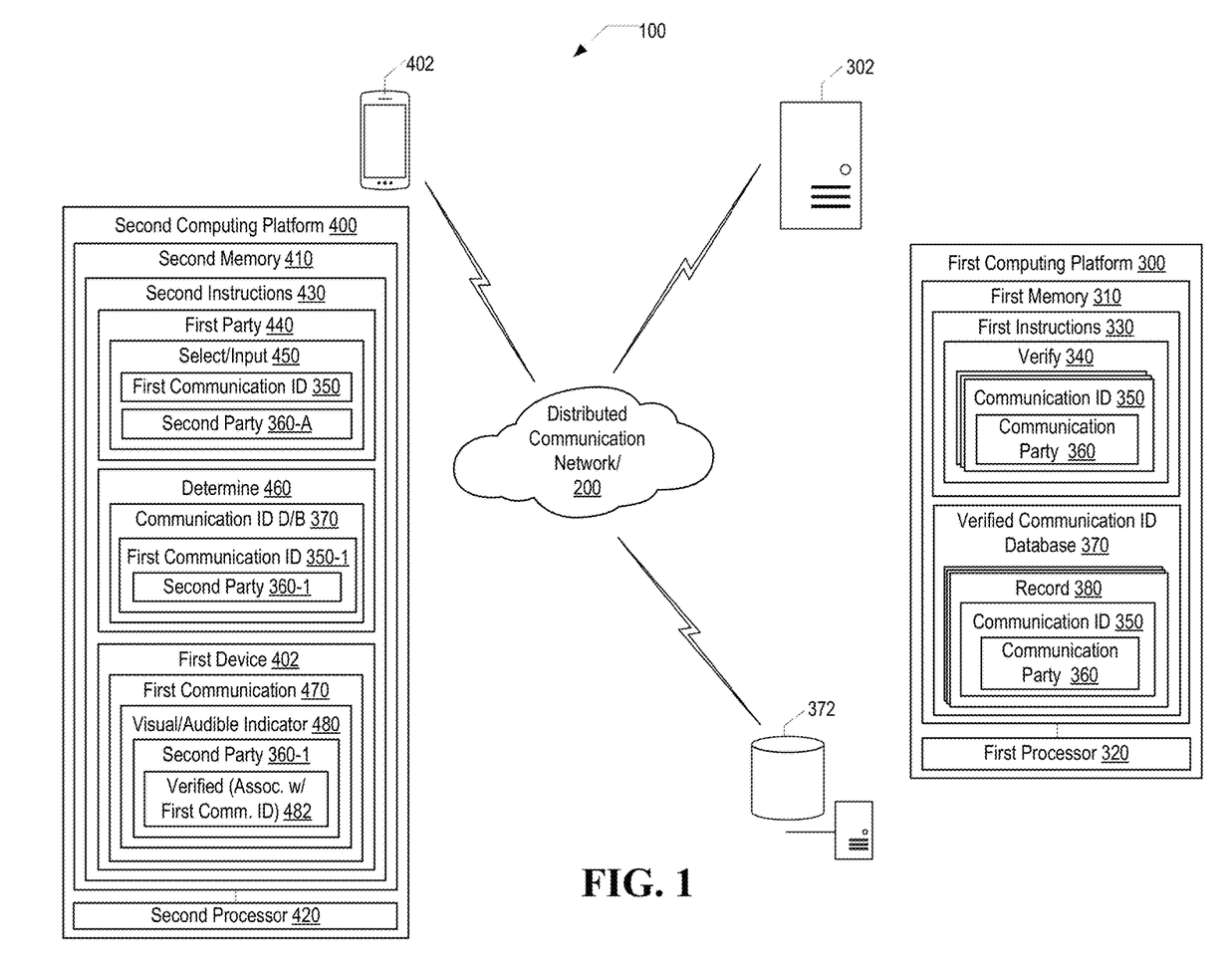
FIG. 1 is a schematic diagram of a system for verifying identities of parties participating in network communications, in accordance with embodiments of the present invention.

FIG. 1 is a schematic diagram of a system 100 configured for verifying identities of parties participating in network-based communications, in accordance with embodiments of the present invention. The network-based communications may be any communication, such as email, Short Message Service/text, telephone or the like, which uses a communication identifier (ID), such as an email address, telephone number or the like as a communication destination address. The system implements a distributed communication network 200, such as, but not limited to, the Internet, one or more intranets, a cellular network, a Public Switched Telephone Network (PSTN) or the like.

The system 100 includes a first computing platform 300 having a first memory 310 and one or more first processors 320 (i.e., processing device) in communication with the first memory 310. The first computing platform 300 may comprise one or more computing devices/apparatus, such as server 302 and database server 372 or the like. The first memory 310 stores first instructions 330 that are executable by the processor(s) 320 and configured to verify 340 that a plurality of communication identifiers (IDs) 350, such as telephone numbers, email addresses and the like are verifiably associated with at least one of a plurality of communication parties 360 (e.g., individual, groups of individuals, enterprise/business or the like). In addition, memory 310 stores a verified communication ID database 370 that is configured to receive the verified communication identifiers 350 and associated communication party 360 and store records 380 that serve to verifiably associate the communication identifiers 350 with the one or more communication parties 360. The verified communication ID database 370 may be compiled by and/or in the control of a trusted entity that possess the capability to verify communication IDs, such as a financial institution, government agency or the like. In such embodiments of the invention, the verified communication ID database 370 may include both internal communication IDs (telephone numbers, email addresses of employees) and external communication IDs (telephone numbers or merchants and, in some customers who opt-in to participating in the listing).

The system additionally includes a second computing platform 400 having a second memory 410 and one or more second processors 420 (i.e., processing device) in communication with second memory 410. The second computing platform may comprise one or more computing devices, such as mobile communication device 402 or any other device suitable for sending and receiving network-based communications via distributed communication network 200. The second memory 410 stores second instructions 430 that are executable by the second processor(s) 420 and configured, in response to a first communication party/user 440 selecting 450 (i) a first communication ID 350-1 for purposes of addressing a first network-based communication that is being sent to a second party 360-1, or (ii) the second party 360-1, determine 460, based on the verified communication ID database 370, whether the first communication ID 350-1 is verifiably associated with the second party 360-1. The instructions 430 are further configured to, in response to determining 460 that the first communication ID 350-1 is verifiably associated with the second party 360-1, provide a visual or audible output/indicator 480 on the first device 402 (i.e., the communication party/user device) that indicates that the second party 360-1 is verifiably associated with the first communication ID 350-1 (i.e., the identity of the holder of the communication ID is verifiably known). For example, if the output is visual a flag, check mark or the like may be displayed in conjunction with the telephone number being dialed/called/texted, the email address to which an email is addressed or the like. In another example, if the output is audible a chime or other predetermined sound may be rendered, which the user/first party 440 recognizes as the audible signal for verification of the association between the first communication ID 350-1 and the second party 360-1.

Figure 2:
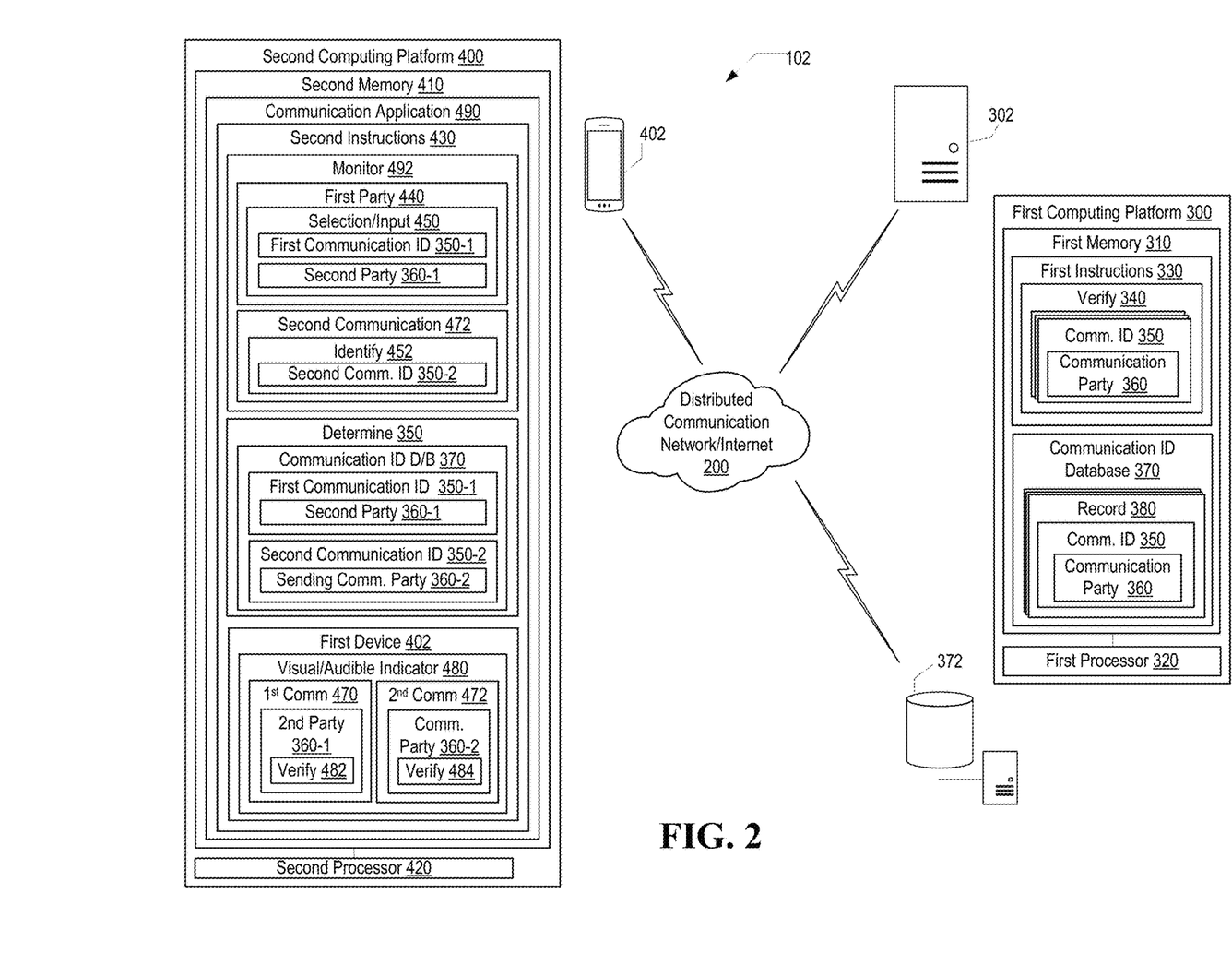
FIG. 2 is a schematic diagram of a system for verifying identities of parties participating in network communications through monitoring of a communication application, in accordance with embodiments of the present invention.

Referring to FIG. 2 a schematic diagram s depicted of system 102 for verifying identities of parties participating in network-based communications, in accordance with alternate embodiments of the present invention. In accordance with the embodiments described in relation to FIG. 2 the second instructions 430 are configured to act as a proxy for a communication application 490, such as convention telephone call application, email application or SMS/text message application executing on mobile communication device 402. In this regard, second instructions 430 are configured to monitor 492 the communication application 490 for (i) user/first party 440 selection/input 450 of a first communication ID 350-1 (e.g., telephone number or email address) for addressing a first network-based communication 470 or a second party 360-1 (e.g., telephone call recipient, text message recipient, email recipient or the like) and/or (ii) receipt of a second network-based communication 472 to identify the second communication ID 350-2 of the sending communication party 360-2.

In response to identifying the first communication ID 350-1 or the second communication ID 350-2, second instructions 430 are further configured to determine whether the first communication ID 350-1 is verifiably associated with the second party 360-1 or whether the second communication ID 350-2 is verifiably associated with a sending communication party 360-2.

In response to determining that the first communication ID 350-1 is verifiably associated with the second party 360-1, second instructions 430 are further configured to provide a visual or audible indicator/output 480 on the first device 402 (i.e., the communication party/user device) that indicates that the second party 360-1 is verifiably associated with the first communication ID 350-1 (i.e., the identity of the holder of the first communication ID 350-1 is verifiably known). For example, if the output is visual a flag, check mark or the like may be displayed in conjunction with the telephone number being dialed/called/texted, the email address to which an email is addressed or the like. In another example, if the output is audible a chime or other predetermined sound may be rendered, which the user recognizes as the audible signal for verification of the association between the first communication ID 350-1 and the second party 360-1. In alternate embodiments, the first network-based communication 470 may also be initiated (e.g., the call dialed, text message or email communicated or the like).

In response to determining that the second communication ID 350-2 is verifiable associated with the sending communication party 360-1, second instructions 430 are further configured to provide visual or audible output/ indicator 480 within or in conjunction with the second network-based communication 472. For example, if the output/indicator 480 is visual a flag, check mark or the like may be displayed within the received email, text message or displayed to the user when the call is being received (i.e., the phone is ringing) and/or during the duration of the call. In another example, if the output/indicator 480 is audible a chime or other predetermined sound, such as a predetermined ringtone different than the user's conventional ringtone may be rendered, which the user (i.e., call/email/text recipient) recognizes as the audible signal for verification of the association between the first communication ID 350-1 and the second party 360-1.

Figure 3:
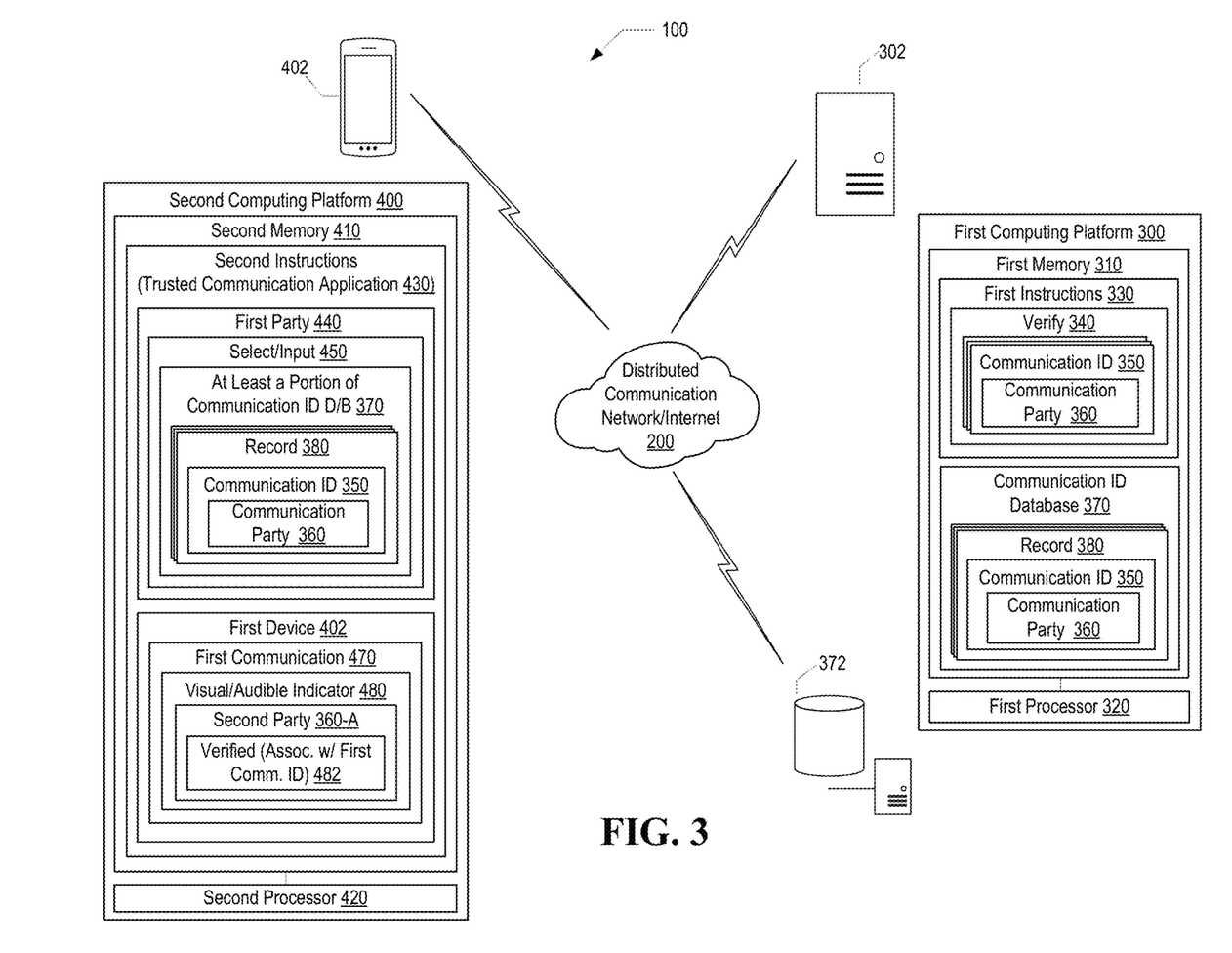
FIG. 3 is a schematic diagram of a system for verifying identities of parties participating in network communications through use of a trusted communication application that links to database records that verifiably associate communication identifiers with communication parties, in accordance with embodiments of the present invention.

Referring to FIG. 3 a schematic diagram is depicted of a system 104 for verifying identities of parties participating in network-based communications, in accordance with alternate embodiments of the present invention. Specifically, in accordance with embodiments described in relation to FIG. 3 second instructions 430 comprise a trusted communication application. In which at least a portion of the verified communication ID database 370 is incorporated into the trusted communication application. The trusted communication application may be a standalone communication application or may be part of or accessible through a trusted application, such as financial institution application, or government agency application or the like. The portion of the verified communication ID database 370 that is incorporated into the trusted communication application may be user-specific, i.e., only include those records 380 that associate communication IDs 350 and communication parties 360 that are relevant to the user or the user has a need for (i.e., a so called need-to-know basis). In specific embodiments of the invention, the trusted communication may be dynamically updateable, such that records 380 can be added to the application or removed from the application based on the user's current needs. For example, a user may be engaged in a telephone call with the entity in control on the application and the entity may direct the user to call or communicate with another party for further assistance. In such instances, the entity in control of the application may push the verified communication ID to the user's trusted communication application and/or the application may generate and display an alert on the user's device that provides the verified communication ID of the party in interest and allows for the user to initiate the communication (dial the telephone number, provide a text dialog box, provide an email message or the like).

In addition, placing calls and/or sending texts and/or emails to verified communication parties, in specific embodiments of the invention, the trusted communication application may be configured to receive calls, texts and/or emails or the like. In such embodiments of the invention, the application may be configured such any communication (e.g., call, text, email or the like received through the application is from a verified communication ID/party. In this regard, the user/party receiving the communication would be assured that the caller or texter/emailer is, in fact, who they purport to be based on the communication being received through the trusted communication application. Further, when communications are received the user/party receiving the communication may be visually or audibly notified with an alert or the like.

Figure 4:
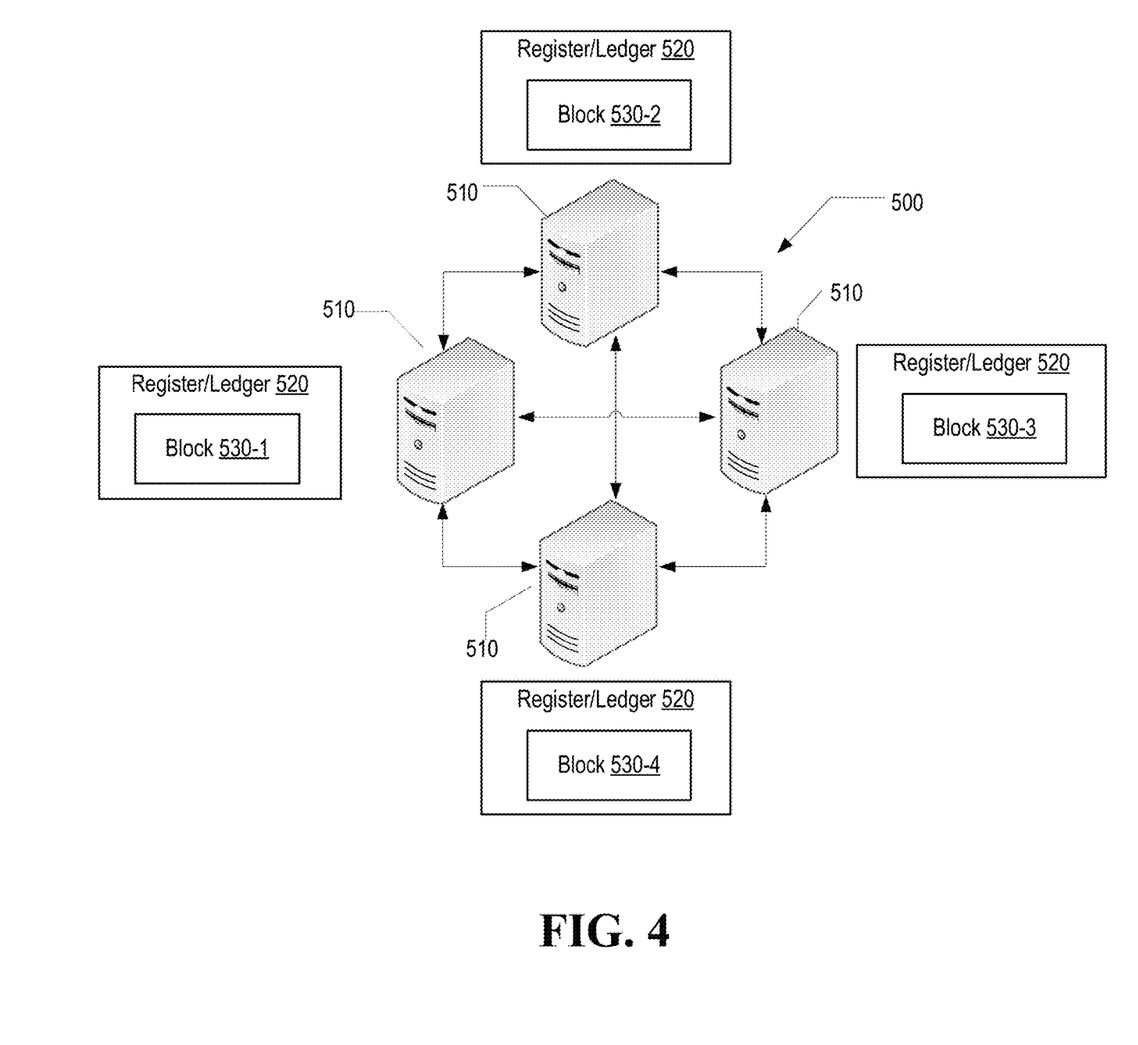
FIG. 4 is a schematic diagram of a distributed trust computing network including a plurality of nodes that store or have access to a distributed ledger, in accordance with embodiments of the present invention.

FIG. 4 is a schematic diagram of an exemplary distributed trust computing network 500 which may, according to specific embodiments of the invention, be used to verify the association between communication IDs and communication parties. The distributed trust computing network 500, in other instances referred to a blockchain network, is a distributed database that maintains, e.g., a list of data records, or the like. In specific embodiments of the invention the data records may include universal tags linked to data files, which are verified by the distributed trust computing network in terms of (i) the authenticity of the data file, and/or (ii) the user associated with the data file (e.g., rightful possessor and/or creator of the digital file). The security of the data maintained within the trust network is enhanced by the distributed nature of the network. The distributed trust computing network 500 typically includes several decentralized nodes 510, which may be one or more systems, machines, computers, databases, data stores or the like operably connected with one another. In some instances, each of the nodes 510 or multiple nodes 510 are maintained by different entities. A distributed trust computing network 500 typically works without a central repository or single administrator.

A distributed trust computing network 500 provides numerous advantages over traditional storage networks/databases. A large number of the decentralized nodes 510 of a trust network may reach a consensus regarding the validity of resources or data maintained with a block of the distributed trust computing network, in the context of the present invention the validity of association between a communication ID 350 and one or more communication parties 360. Additionally, when multiple different suspected verification records 380 exist on the distributed register/ledger 520, multiple decentralized nodes 510 can converge on the most recent verification record 380, such that the most verification record 380 is verified and reflects the current verified association of a communication ID 350 with one or more communication parties 360. For example, in the case of communication ID verification, any decentralized node 510 within the distributed trust computing network 500 that stores a record 380 can determine within a level of certainty whether the record 380 can be authenticated/verified and become final by confirming that no conflicting records are confirmed by the distributed trust computing network 500 elsewhere.

The distributed trust computing network 500 typically has two primary types of records. The first type is the record type, which consists of the actual data stored in a block 530 (shown in FIGS. 4 and 5) within a distributed register/ledger 520. The second type is the block type, which are records that confirm when and in what sequence certain events became recorded as part of the distributed trust computing network. Records, such as communication ID verification records 380, and the events associated therewith are created by participants using the distributed trust computing network 500 in its normal course of business, for example, when a communication ID is assumed to be associated with a communication party, a data block(s) 530 is created by users known as "miners" who use specialized software/equipment to create data blocks 530. Holders (also, referred to as users) of a store block of the distributed trust computing network agree to store the data block 530 within the distributed trust computing network 500 and the related data blocks 530 are passed around to various nodes 510 of the distributed trust computing network 500. A "valid" data block 530 or related event is one that can be validated based on a set of rules that are defined by the particular system implementing the distributed trust computing network 500. For example, in the case of communication ID verification, a valid data block 530 is one that authenticates data in the data block to which it is linked and/or the user/creator/owner of the data block and authorizes specific predetermined entities to access at least a portion of the distributed register/ledger 520 to gain access to the data contained in the data block 530.

A distributed trust computing network 500 is typically decentralized—meaning that a distributed register/ledger 520 (i.e., a decentralized register/ledger) is maintained on multiple nodes 510 of the distributed trust computing network 500. In this regard, one node 510 in the distributed trust computing network 500 may have a complete or partial copy of the entire distributed register/ledger 520 or set of records and/or blocks 530 on the distributed trust computing network 500. Events are initiated at a node 510 of a distributed trust computing network 500 and communicated to the various other nodes 510 of the distributed trust computing network 500. Any of the nodes 510 can validate the content of a data block 530 or an associated event, add the data block 530 and/or the contents of the data block 530 to its copy of the distributed register/ledger 520, and/or broadcast the detail/data of the data block 530, its associated validation (in the form of a data block 530) and/or other data to other nodes 510. The distributed trust computing network 500 shown in FIG. 4 is configured to perform one or more of the steps or functions performed by the system shown in FIGS. 1, 2, 3 and/or 5 the computing platform shown in FIG. 6 and the method described by FIG. 7.

Figure 5:
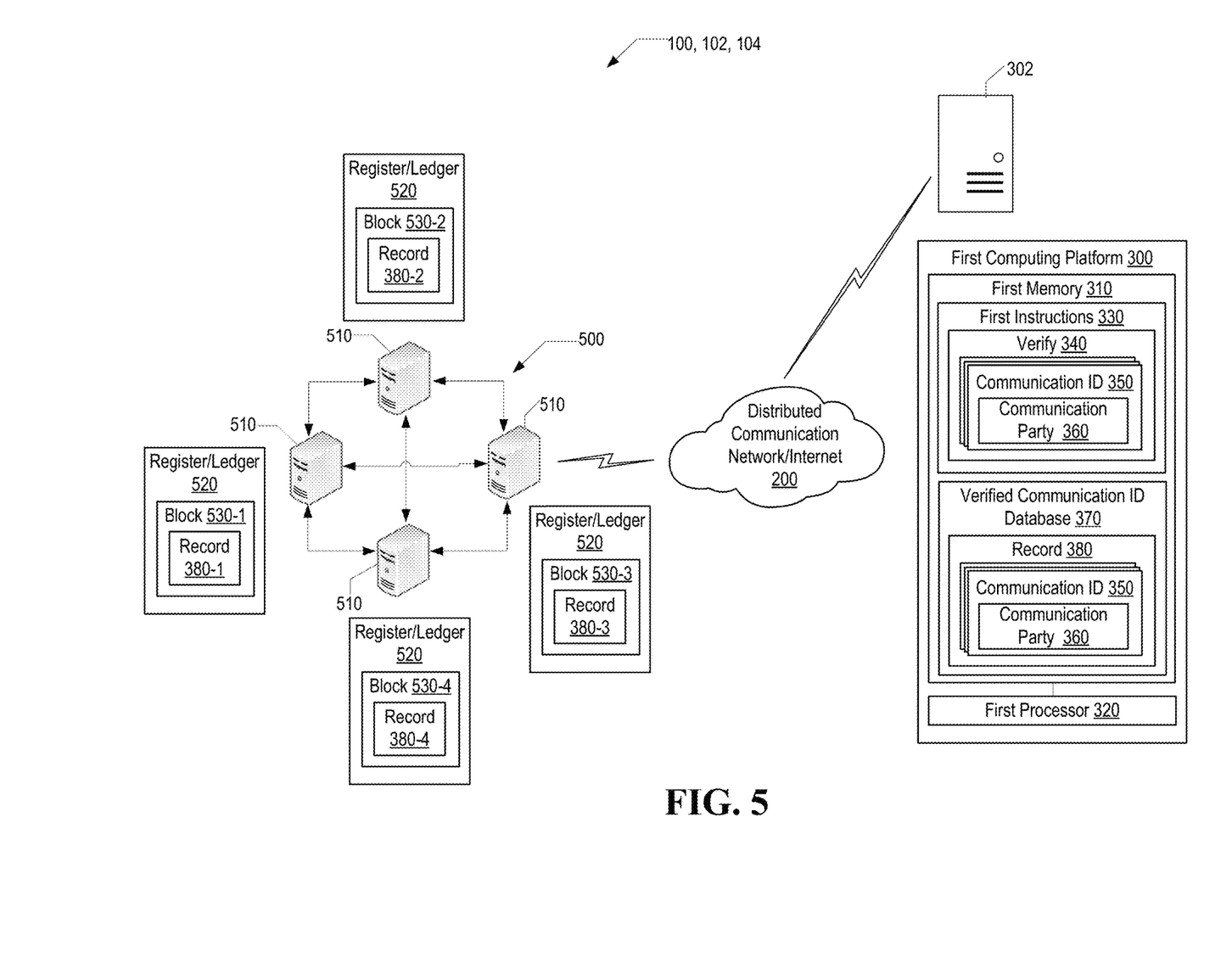
FIG. 5 is a schematic diagram of a system in which a distributed trust computing network is implemented to verify the associations between communication parties and communication identifiers, in accordance with embodiments of the present invention.

Referring to FIG. 5 a schematic diagram of a portion of systems 100, 102, and 104 are depicted in which the verification and storage of the verified communication ID database occurs via a distributed trust computing network 500, in accordance with embodiments of the present invention. In such embodiments of the invention, first instructions 330 are implemented within the distributed trust computing network to verify 340 that communication IDs 350 are verifiably associated with one or more communication parties 360. In this regard, the distributed trust computing network 500, acting as a source of truth, is configured to have multiple nodes 510 converge on a data block 520 to verify the data contained therein, in this instance, the association between the communication ID (i.e., telephone number, email address or the like) and the communication party (i.e., individual, group of individuals, enterprise/business or the like). Moreover, the distributed register/ledger 520 acts as the verified communication ID database 370 by systematically storing the records 380-1-380-4 and the like that verifiably associate the communication IDs 350 with communication parties 360 as valid data blocks 530-1-530-4 and the like.

Figure 6:
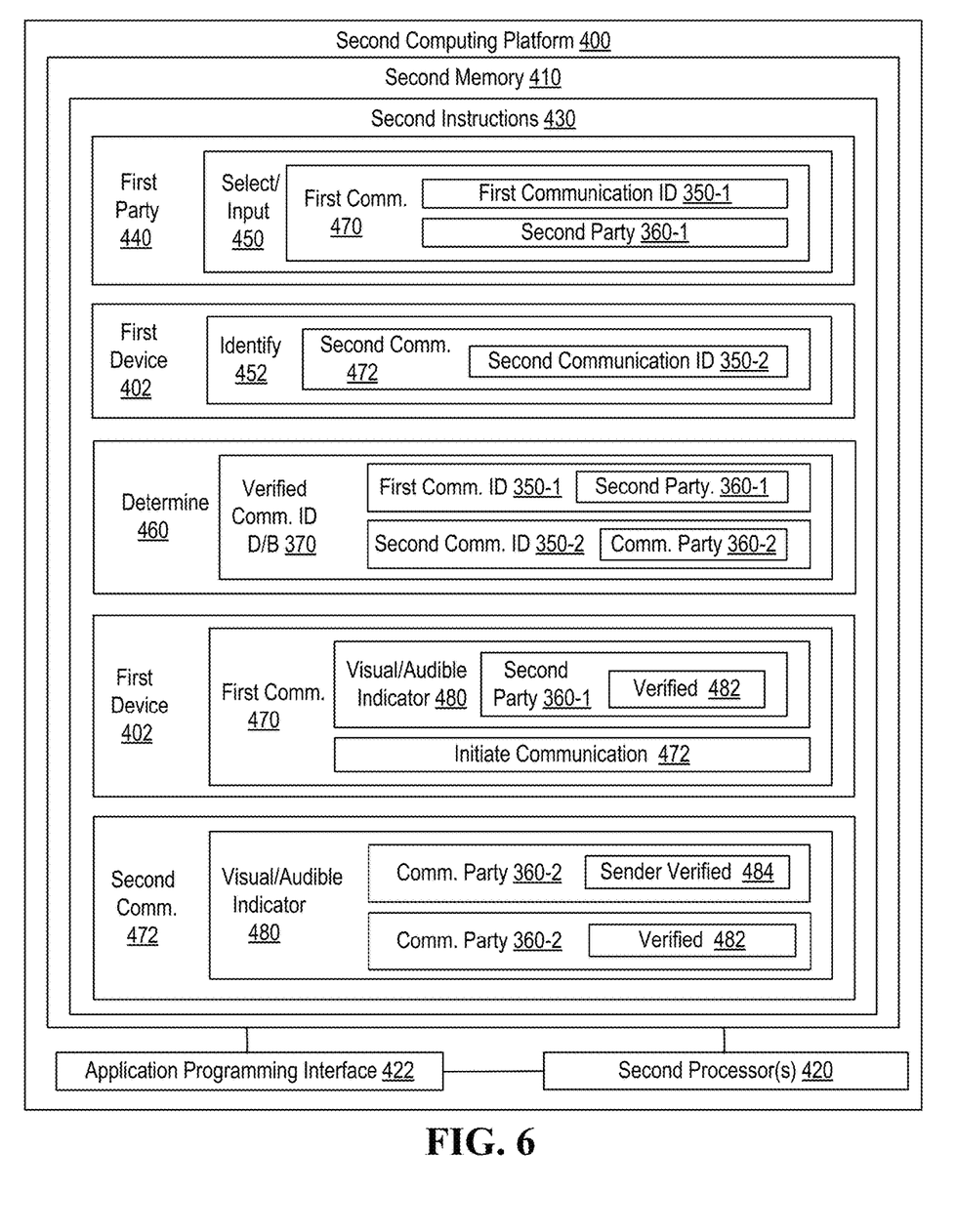
FIG. 6 is a block diagram of a computing platform configured for verifying identities of parties participating in network communications, in accordance with embodiments of the present invention.

Referring to FIG. 6, depicted is second computing platform 400 configured for providing communication ID validation for network-based communication, in accordance with embodiments of the present invention. In addition to providing greater detail, FIG. 6 highlights various alternative embodiments of the invention. The second computing platform 400 may comprise one or more computing devices (e.g., a mobile communication device, such as a mobile telephone, backend servers or the like) and is configured to execute engines, including instructions, algorithms, modules, routines, applications and the like. As previously noted, second computing platform 400 includes second memory 410 and the like which may comprise volatile and non-volatile memory, such as read-only and/or random-access memory (RAM and ROM), EPROM, EEPROM, flash cards, or any memory common to computing platforms). Moreover, second memory 410 and the like may comprise cloud storage, such as provided by a cloud storage service and/or a cloud connection service.

Further, second computing platform 400 also includes at least one second processor 420, otherwise referred to as a processing device or the like which may be an application-specific integrated circuit ("ASIC"), or other chipset, logic circuit, or other data processing device configured to execute second instructions 430. Second processing device(s) 420 or the like may execute one or more application programming interface (APIs) 422 that interface with any resident programs, such as instructions 430 or the like stored in the second memory 410 of the second computing platform 400 and any external programs. Second processing device(s) 420 may include various processing subsystems (not shown in FIG. 6) embodied in hardware, firmware, software, and combinations thereof, that enable the functionality of second computing platform 400 and the operability of second computing platform 400 on the distributed communications network 200 (shown in FIGS. 1-3 and 5). For example, processing subsystems allow for initiating and maintaining communications and exchanging data with other networked devices, such as first computing platform 300, including server 302 database server 372 and distributed trust computing network 500 (shown in FIGS. 1-3 and 5). For the disclosed aspects, processing subsystems of second computing platform 400 may include any processing subsystem used in conjunction with instructions 430 and related engines, tools, routines, sub-routines, algorithms, sub-algorithms, sub-modules thereof.

Second computing platform 400 may additionally include a communications module (not shown in FIG. 6) embodied in hardware, firmware, software, and combinations thereof, that enables electronic communications between second computing platform 400 and other network devices, such as, but not limited to, first computing platform 300, including server 302 database server 372 and distributed trust computing network 500 (shown in FIGS. 1-3 and 5). Thus, communication module may include the requisite hardware, firmware, software and/or combinations thereof for establishing and maintaining a network communication connection with one or more network devices.

Memory 410 of second computing platform 400 stores instructions 430 that are executable by second processor(s) 420 and configured to, in response to a first party 440 (i.e., a communication sending party) selecting or inputting 450 a first communication ID 350-1 or a second party 360-1 for addressing a first network communication that is being sent to the second party 360-1, determine 460, based on the verified communication ID database 370, whether the first communication ID 350-1 is verifiably associated with the second party 360-1. In response to determining that the first communication ID 350-1 is verifiably associated with the second party 360-1, instructions 430 are further configured to provide a visual or audible output/indicator 480 at the first device 402 within or in conjunction with the first network-based communication 470 that indicates that the second party 360-1 is verified as being associated with the first communication ID 350-1. For example, if the output is visual a flag, check mark or the like may be displayed in conjunction with the telephone number being dialed/called/texted, the email address to which an email is addressed or the like. In another example, if the output is audible a chime or other predetermined sound may be rendered, which the user recognizes as the audible signal for verification of the association between the first communication ID 350-1 and the second party 360-1.

In alternate embodiments of the invention, in response to determining that the first communication ID 350-1 is verifiably associated with the second party 360-1, instructions 430 are further configured to initiate the communication 472 (e.g., the call dialed, text message or email communicated or the like).

In other embodiments of the invention, instructions 430 are configured to, in response to the first device 430 receiving a second network-based communication 472, identify 452 a second communication ID 350-2 associated with the communication 472 (i.e., the sending party's communication ID 350-2, such as telephone number, email address or the like). In response to identifying the second communication ID 350-2, instructions 430 are configured to determine, based on the verified communication ID database 370, whether the second communication ID 350-2 is verifiably associated with a communication party 360-2. Further, in response to determining that the second communication ID 350-2 is verifiably associated with a communication party 360-2, instructions 430 are configured to provide a visual or audible output/indicator 480 within or in conjunction with the second communication 474 that provides at least one of (i) identifying the communication party 360-2 as the verified sender 484 of the second network-based communication 484, and (ii) indicating that the communication party 360-2 is verifiably associated with the second communication ID 350-2. For example, if the output/indicator 480 is visual a flag, check mark or the like may be displayed within the received email, text message or displayed to the user when the call is being received (i.e., the phone is ringing) and/or during the duration of the call. In another example, if the output/indicator 480 is audible a chime or other predetermined sound, such as a predetermined ringtone different than the user's conventional ringtone may be rendered, which the user (i.e., call/email/text recipient) recognizes as the audible signal for verification of the association between the first communication ID 350-1 and the second party 360-1.

Figure 7:
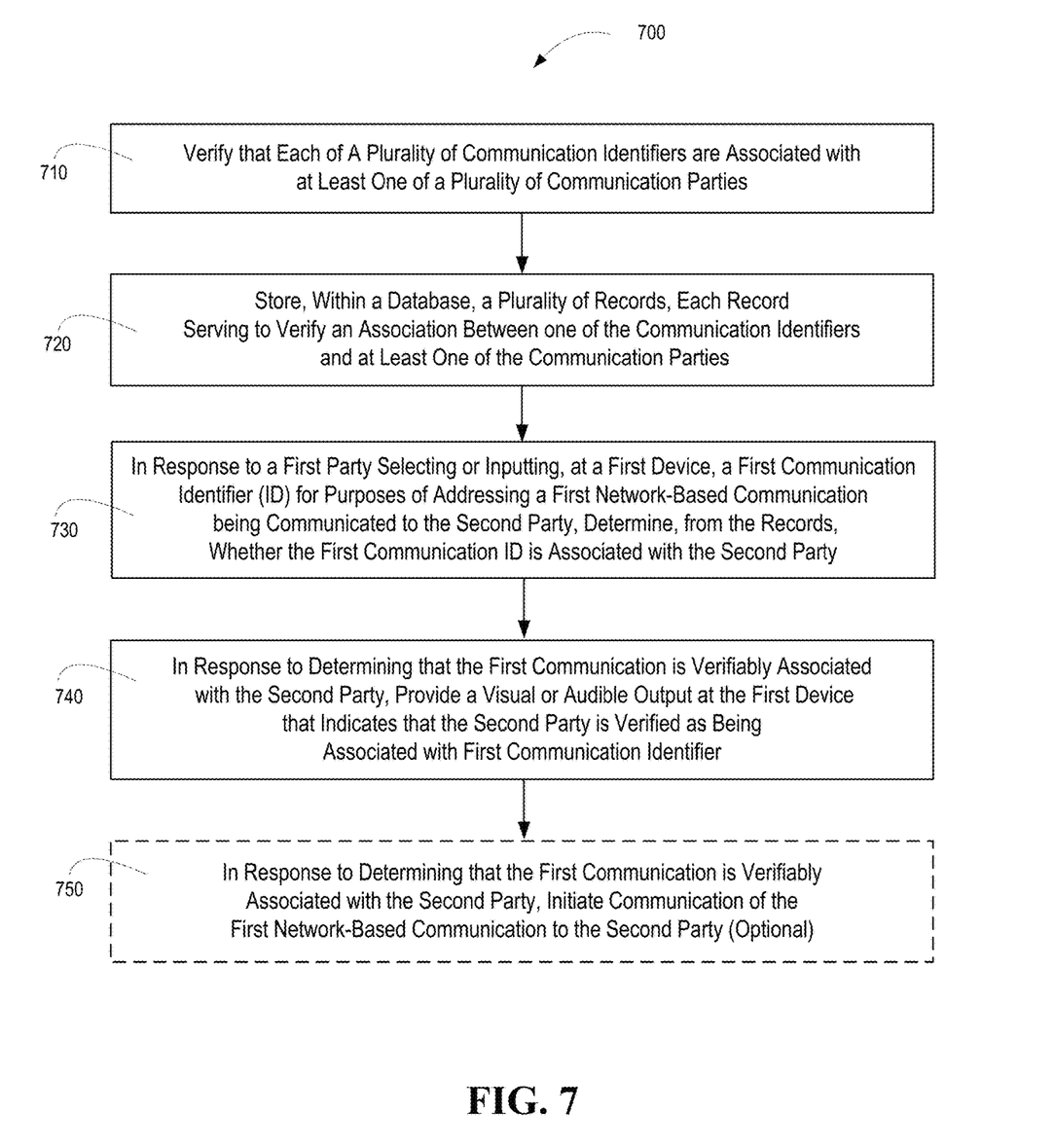
FIG. 7 is a flow diagram of a method for verifying identities of parties participating in network communications, in accordance with an aspect of the present invention.

Referring to FIG. 7 a flow diagram is presented of a method 700 for verifying identities of parties participating in network-based communications, in accordance with embodiments of the present invention. At Event, 710, each of a plurality of communication identifiers (IDs) are verified as being associated with at least one of a plurality of communication parties. The communication IDs may include, but are not limited to, telephone numbers, email addresses or tokens associated with telephone numbers or email addresses. The communication parties may include, but are not limited to, individuals, groups of individuals, businesses/enterprises or the like. In specific embodiments of the invention in which the verification method is implemented by a trusted entity, such as a financial institution or government agency, the communication parties may include associates/employees of the trusted entity, specific groups of associates/employees, third-party entities having a relationship with the trusted entity or the like. As previously discussed, in specific embodiments of the invention the verification is performed within a distribute trust computing network, in which a plurality of nodes converge to validate a data block that include a record denoting an association between a communication ID and at least one communion party.

At Event 720, a plurality of records is stored within a verified communication ID database, each record serves to verify/validate that a communication ID is verifiably associated with at least one communication party. As previously discussed, in specific embodiments of the invention the database may take the form of a distributed ledger stored within or otherwise accessible through a distributed trust computing network. In other embodiments of the invention, at least portions of the verified communication ID database is made accessible to users through a trusted communication application that is configured to allow users select communication IDs and/or communication parties from those listed in the accessible portion of the database and initiate communication using verified communication IDs. The verified communication ID database may be compiled by and/or in the control of a trusted entity that possess the capability to verify communication IDs, such as a financial institution, government agency or the like. In such embodiments of the invention, the verified communication ID database may include both internal communication IDs (telephone numbers, email addresses of employees) and external communication IDs (telephone numbers or merchants and, in some customers who opt-in to participating in the listing).

In response to a first party (i.e., the communication sending party) selecting or inputting, at a first device, first communication ID for purposes of addressing a first-network based communication being communicated to a second party (i.e., the communication receiving party), at Event 730, a determination is made from the database records, whether the first communication ID is verifiably associated with the second party. In specific embodiments of the invention, a conventional communication application (e.g., telephone application, email application, text message application or the like) is monitored for user/first party selection or input of telephone numbers, email addresses and the like and, in response, the verified communication ID database is accessed to determine if the communication ID is verifiably associated with one or more communication parties. In other embodiments of the invention, the user selects a communication ID from at least a portion of the verified communication ID database that is accessible to or otherwise imported into a trusted communication application. In such application the determination of whether the communication ID is verifiably associated with a communication party is implicitly made by selecting a communication ID or associated party from the database.

In response to determining that the first communication ID is verifiably associated with the second party, at Event 740, a visual or audible output/indicator is provided at the first/user device that indicates that the second party is verifiably associated with the first communication ID 350-1 (i.e., the identity of the holder of the communication ID is verifiably known). For example, if the output is visual a flag, check mark or the like may be displayed in conjunction with the telephone number being dialed/called/texted, the email address to which an email is addressed or the like. In another example, if the output is audible a chime or other predetermined sound may be rendered, which the user/first party recognizes as the audible signal for verification of the association between the first communication ID and the second party. At optional Event 750, in further response to determining that the first communication ID is verifiably associated with the second party, the communication of the first network-based communication to the second party is initiated (i.e., the telephone call is dialed, the email/text is sent or the like).

As evident from the preceding description, the systems, methods and the like described herein represents an improvement in technology, specifically, verification of the identities of parties participating in network-based communication, such as telephone communication, including SMS/text communication, email communication and the like. Communication identifiers (IDs) (e.g., telephone numbers, email addresses or the like) are verified as being associated with one or more communication parties and, in response to verification, establishes a verified communication (ID) database that stores records that serve to verifiably associate the communication IDs with the communication parties. The verified communication ID database is subsequently relied upon when a user/communication is (i) selecting a communication ID as an address for an impending communication or (ii) receiving a communication for determining whether the communication ID is verifiably associated with a known communication party. If the communication ID is determined to be verifiably associated with a known communication party, a visual or audible output may be provided on the user's device or within the communication that indicates that the communication ID is verifiably associated with the known communication party.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for verifying identities of parties participating in network communications, the system comprising:
   a first computing platform including a first memory and at least one first processing device in communication with the first memory, wherein the first memory stores:
   (i) first instructions that are executable by the first processing device and configured to verify that electronic mail (email) addresses are associated with at least one of a plurality of communication parties, and
   (ii) an email address database configured to receive the verified email addresses and associated communication parties and store records that serve to associate each of the email addresses with one or more of the communication parties; and
   a second communication platform including a second memory and at least one second processing device in communication with the second memory, wherein the second memory stores second instructions that are executable by the second processing device and configured to:
   in response to a first party selecting or inputting, at a first device, a first email address for purposes of addressing a first network-based email communication that is being sent to a second party, access the email database to determine whether the first email address is verifiably associated with the second party, in response to determining that the first email address is verifiably associated with the second party, provide a visual or audible output at the first device that indicates that the second party is verified as being associated with first email address, act as proxy for a communication application executing on the first device by (i) monitoring the communication application to identify first email addresses being selected by the first party for purposes of addressing communications being communicated through the communication application to second parties, (ii) in response to identifying a first email address, access the email address database to determine whether the first email address is verifiably associated with a second party, and (iii) in response to determining that the first email address is verifiably associated with the second party, provide a visual or audible output at the first device that indicates that the second party is verified as being associated with first email address, monitor the communication application for receipt of second network-based email communications and identify, from the communications, second email addresses included within the second network-based email communications, in response to identifying a second email address, access the email address database to determine whether the second email address is verifiably associated with a communication party, and in response to determining that the second email address is verifiably associated with a communication party, provide, as part of the second communication, a visual or audible output at a first device that is configured for at least one of (i) identifying the communication party as the sender of the second network-based email communication and (ii) indicating that the communication party is verifiably associated with second email address.

2. The system of claim 1, wherein the second instructions are further configured to, in response to determining that the first email address is verifiably associated with the second party, initiate communication of the first network-based email communication to the second party.

3. The system of claim 1, wherein the second instructions are further configured to:
in response to the first device receiving a second network-based email communication, identify a second email address included within the second network-based email communication,
in response to identifying the second email address determine, from the email address database, whether the second email address is verifiably associated with a communication party, and
in response to determining that the second email address is verifiably associated with a communication party, provide, as part of the second communication, a visual or audible output at a first device that is configured for at least one (i) identifying the communication party as the sender of the second network-based email communication and (ii) indicating that the communication party is verifiably associated with second email address.

4. The system of claim 1, wherein the second instructions are further configured to, in response to determining that the first email address is verifiably associated with the second party, initiate communication of the first network-based email communication to the second party.

5. The system of claim 1, wherein the second instructions are further configured to:
provide the first device with a visual or audible listing, compiled from the email address database, of a plurality of verified email addresses and corresponding parties associated with each of the verified email addresses, and
in response to the first party selecting one of (i) a first verified email address from the listing or (ii) a second party associated with the first verified email address, address the first network-based email communication with the first verified email address, and provide the visual or the audible output at the first device that indicates that the second party to is verified as being associated with first email address.

6. The system of claim 1, wherein the first instructions are further configured to implement a trusted distributed communication network including a plurality of decentralized nodes to validate, based on a convergence by at least two of the decentralized nodes, that the email addresses are verifiably associated with at least one of the plurality of communication parties.

7. The system of claim 6, wherein the first instructions are further configured to store the database as part of a distributed ledger that is in communication with or stored within the trusted distributed communication network.

8. A computer-implemented method for verifying identities of parties participating in network communications, the computer-implemented method is executable by one more processing devices and comprising:
verifying that each of a plurality of electronic mail (email) addresses are associated with at least one of a plurality of communication parties;
storing, within a database, a plurality of records, each record serving to verify an association of one of the plurality of email addresses with at least one of the communication parties;
in response to a first party selecting or inputting, at a first device, a first email address for purposes of addressing a first network-based email communication that is being sent to a second party, determining, from the database, whether the first email address is verifiably associated with the second party;
in response to determining that the first email address is verifiably associated with the second party, providing a visual or audible output at the first device that indicates that the second party is verified as being associated with first email address;
monitoring a communication application to identify first email addresses being selected by the first party for purposes of addressing communications being communicated through the communication application to second parties;
in response to identifying a first email address, accessing the database to determine whether the first email address is verifiably associated with the second party;
monitoring the communication application for receipt of second network-based email communications and identify, from the communications, second email addresses included within the second network-based email communications;
in response to identifying a second email address, accessing the database to determine whether the second email address is verifiably associated with a communication party; and in response to determining that the second email address is verifiably associated with a communication party, providing, as part of the second communication, a visual or audible output at a first device that is configured for at least one of (i) identifying the communication party as the sender of the second network-based email communication and (ii) indicating that the communication party is verifiably associated with second email address.

9. The computer-implemented method of claim 8, further comprising, in response to determining that the first email address is verifiably associated with the second party, initiating the first network-based email communication to the second party.

10. The computer-implemented method of claim 8, further comprising:
   in response to the first device receiving a second network-based email communication, identifying a second email address included within the second network-based email communication;
   in response to identifying the second email address, determining, from the database, whether the second email address is verifiably associated with a communication party; and
   in response to determining that the second email address is verifiably associated with a communication party, providing, as part of the second communication, a visual or audible output at a first device that is configured for at least one (i) identifying the communication party as the sender of the second network-based email communication, and (ii) indicating that the communication party is verifiably associated with second email address.

11. The computer-implemented method of claim 8, further comprises:
   providing the first device with a visual or audible listing, compiled from the database, of a plurality of verified email addresses and corresponding parties associated with each of the verified email addresses, and
   wherein determining and providing the visual or audible output further comprises:
   in response to the first party selecting one of (i) a first verified email address from the listing or (ii) a second party associated with the first verified email address, addressing the first network-based email communication with the first verified email address, initiate communication of the first network-based email communication to the second party and provide the visual or the audible output at the first device that indicates that the second party to is verified as being associated with first email address.

12. A computer program product comprising a non-transitory computer-readable medium, the computer-readable medium including:
   a first set of codes for causing a computer processing device to verify that each of a plurality of email addresses are associated with at least one of a plurality of communication parties;
   a second set of codes for causing a computer processing device to store, within a database, a plurality of records, each record serving to verify an association of one of the plurality of email addresses with at least one of the communication parties;
   a third set of codes for causing a computer processing device to, in response to a first party selecting or inputting, at a first device, a first email address for purposes of addressing a first network-based email communication that is being sent to a second party, determine, from the database, whether the first email address is verifiably associated with the second party;
   a fourth set of codes for causing a computer processing device to, in response to determining that the first email address is verifiably associated with the second party, provide a visual or audible output at the first device that indicates that the second party is verified as being associated with first email address; and
   a fifth set of codes for causing a computer monitoring a communication application to identify (i) first email addresses being selected by the first party for purposes of addressing communications being communicated through the communication application to second parties, (ii) from the second network-communications received at the communication application, second email addresses included within the second network-based email communications,
   wherein the third set of codes are further configured to cause the computer processing device to, in response to identifying the first and second email addresses, accessing the database to determine (i) whether the first email address is verifiably associated with the second party and (ii) whether the second email address is verifiably associated with a communication party, and
   wherein the fourth set of codes are further configured to cause the computer processor device to, in response to determining that the second email address is verifiably associated with a communication party, provide one of (i) a visual or audible output at the first device that indicates that the second party is verified as being associated with first email address, and (ii) as part of the second communication, a visual or audible output at a first device that is configured for at least one of (a) identifying the communication party as the sender of the second network-based email communication and (b) indicating that the communication party is verifiably associated with second email address.

13. The computer program product of claim 12, wherein the fourth set of codes are further configured to cause the computer processing device to initiate communication of the first network-based email communication to the second party.

14. The computer program product of claim 12, further comprising:
   a fifth set of codes for causing a computer processing device to, in response to the first device receiving a second network-based email communication, identifying a second email address included within the second network-based email communication;
   a sixth set of codes for causing a computer processing device to, in response to identifying the second email address, determine, from the database, whether the second email address is verifiably associated with a communication party; and
   a seventh set of codes for causing a computer processing device to, in response to determining that the second email address is verifiably associated with a communication party, provide, as part of the second communication, a visual or audible output at a first device that is configured for at least one (i) identifying the communication party as the sender of the second network-based email communication, and (ii) indicating that the communication party is verifiably associated with second email address.

* * * * *